United States Patent [19]

Fraioli, Sr.

[11] 3,946,857

[45] Mar. 30, 1976

[54] CONVEYOR BELT SYSTEM INCLUDING STRAIGHT LINE AND CURVED SECTIONS

[76] Inventor: Joseph Fraioli, Sr., 300 Martine Ave., White Plains, N.Y. 10601

[22] Filed: July 29, 1974

[21] Appl. No.: 492,854

Related U.S. Application Data

[62] Division of Ser. No. 411,082, Oct. 30, 1973, Pat. No. 3,854,575.

[52] U.S. Cl. ............... 198/189; 198/194; 198/202
[51] Int. Cl.² ...................................... B65G 17/00
[58] Field of Search .......... 198/181, 182, 189, 193, 198/195, 202, 194

[56] References Cited
UNITED STATES PATENTS

| | | | |
|---|---|---|---|
| 2,253,913 | 8/1941 | Paterson | 198/194 |
| 2,278,361 | 3/1942 | Rapisarda | 198/182 |
| 3,217,861 | 11/1965 | Daniluk et al. | 198/182 |
| 3,854,575 | 12/1974 | Fraioli | 198/182 |

Primary Examiner—Evon C. Blunk
Assistant Examiner—Joseph E. Valenza

[57] ABSTRACT

An endless belt conveyor system for transporting articles along a path which includes straight line and curved sections. The straight line section is constituted by a pair of parallel rails over which the belt is movable, the opposing outer margins of the belt overhanging the rails and riding thereover whereby the rails function as a bed for the belt. Rollers are mounted on the underside of the overhangs of the belt at spaced positions along the outer margins, the rollers engaging the outer surfaces of the rails and being tracked thereby whereby lateral movement of the belt in the course of movement is prevented.

3 Claims, 15 Drawing Figures

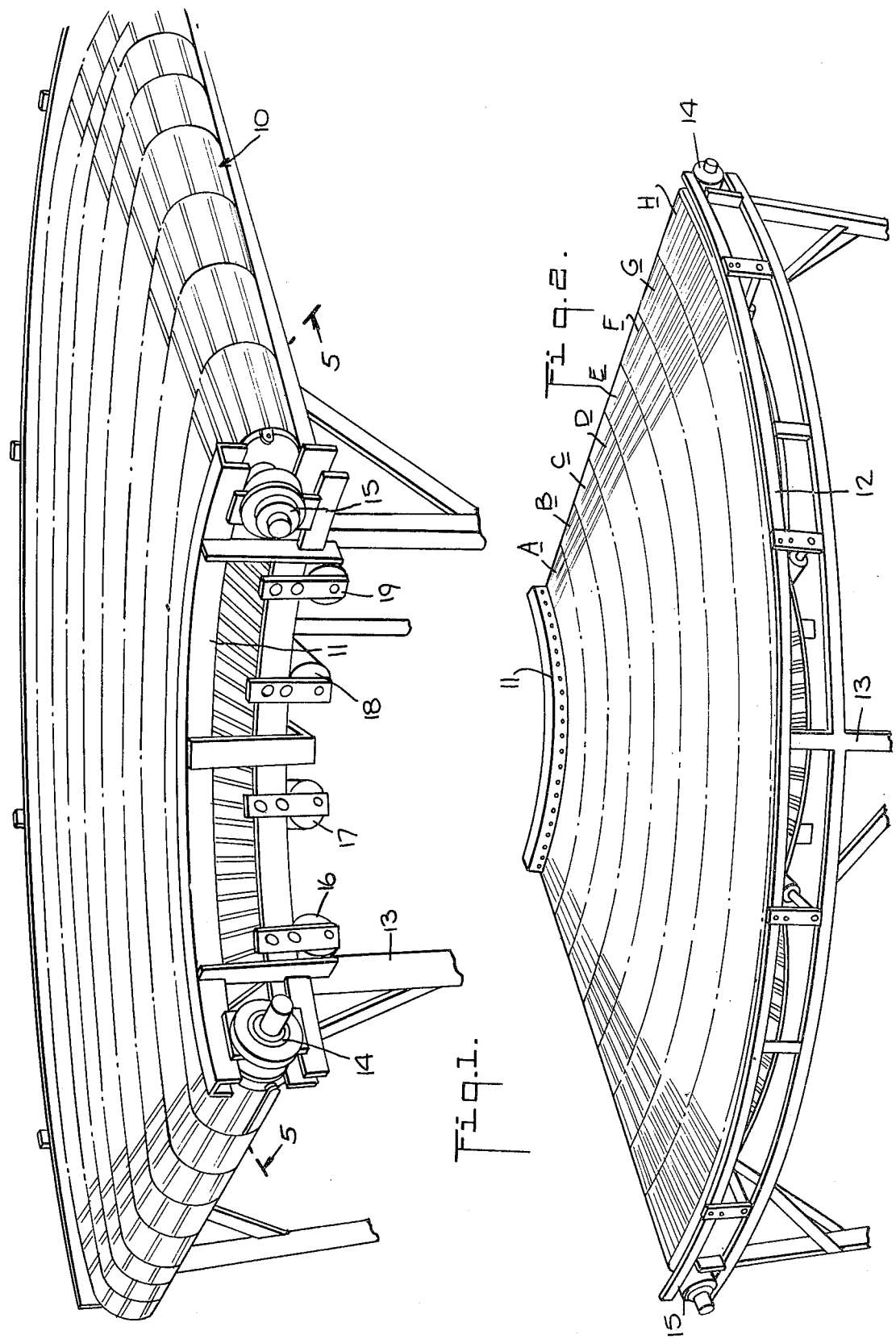

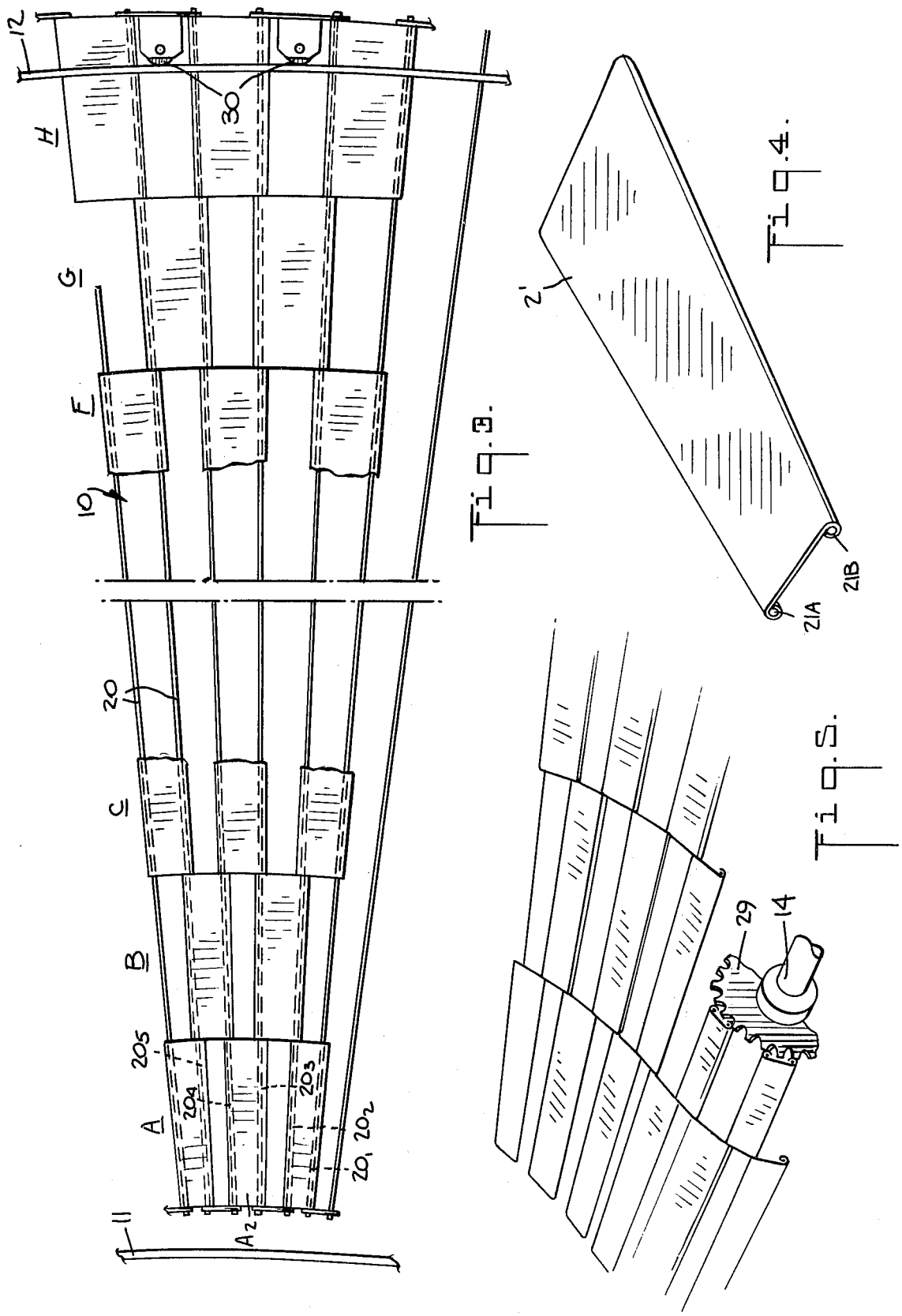

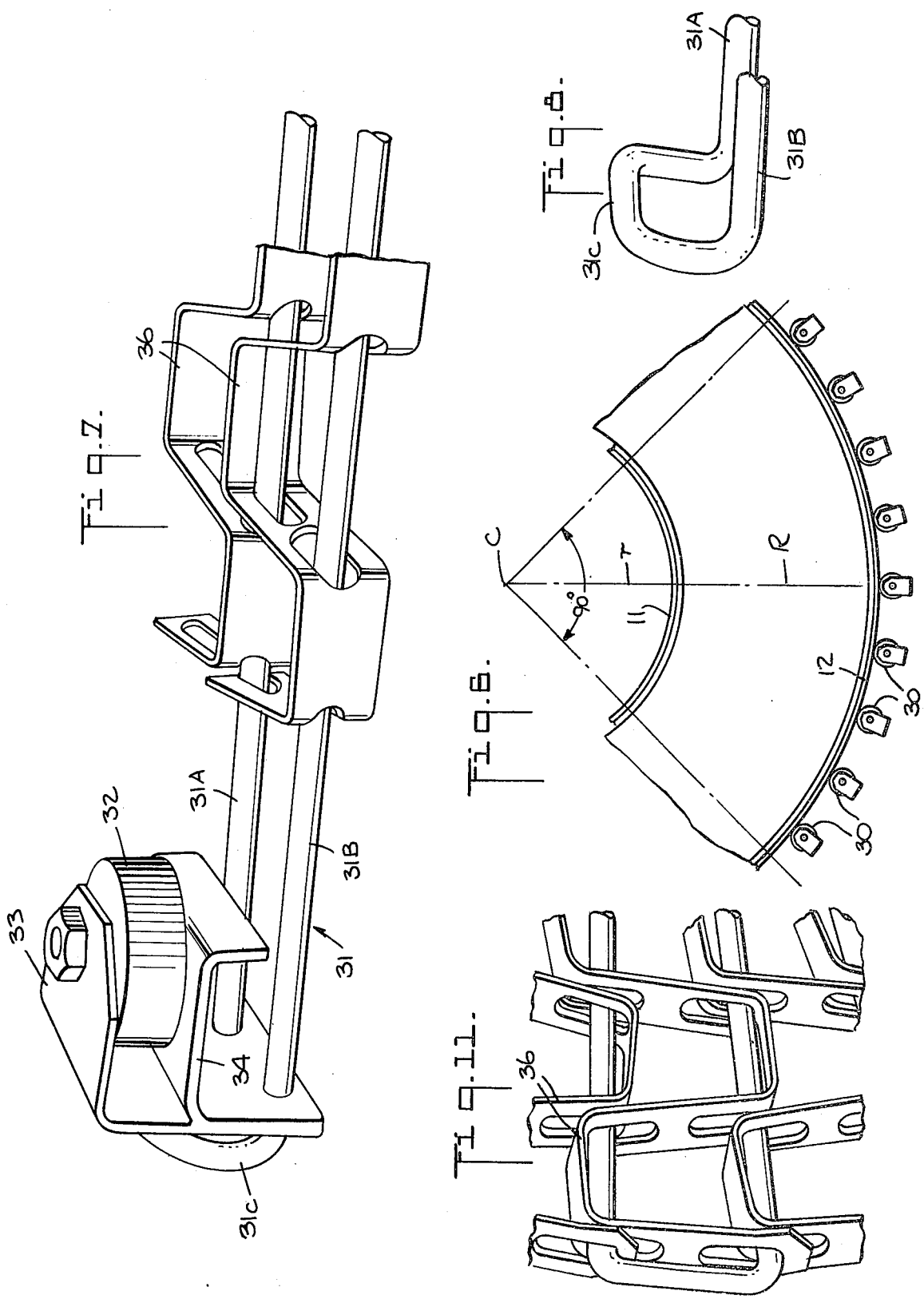

CONVEYOR BELT SYSTEM INCLUDING STRAIGHT LINE AND CURVED SECTIONS

RELATED APPLICATION

This application is a division of copending application Ser. No. 411,082, filed Oct. 30, 1973, now U.S. Pat. No. 3,854,575.

BACKGROUND OF THE INVENTION

This invention relates generally to conveyor belt systems, and more particularly to a system including an endless belt adapted to transport articles along a path having a straight line section and a curved section.

The conventional endless belt conveyor assembly, whether the belt is fabricated of flexible sheet material in metallic or fabric form, or is of mesh or link construction, is only capable of transporting articles in a straight path from an input to a discharge point. In many instances, it is desirable for the conveyor to change the direction of travel by making a lateral bend in the travel path in order, for example, to transport articles from the output of one work station to the input of a subsequent station whose position is laterally displaced from the first station.

Thus in some manufacturing operations, products emerging say from a heating station must be conveyed in a right angle path to a packaging or processing machine, in which event a conveyor capable of making a 90° turn is required. In other instances, it is necessary to transport products in a reverse direction in which case one must make a 180° turn. Conveyor belt assemblies are commercially available which are capable of negotiating 90° and 180° turns, but such assemblies have numerous practical drawbacks, particularly in food handling operations.

In one such known belt assembly, the belt is made of links and rods covered by a woven wire mesh or grid. Though such belts are capable of making lateral turns, they inherently possess a high degree of friction and must be frequently lubricated. Where the belt serves to convey food products, the need for lubrication is objectionable, for the lubricant may contaminate the conveyed food products. Moreover, a grid or mesh belt is difficult to clean and maintain in a sanitary condition.

Also where the belt is inherently difficult to advance because its construction gives rise to frictional resistance, the driven belt tends to vibrate or chatter, rather than to move smoothly and effortlessly, as a result of which the products conveyed thereby may be jostled.

SUMMARY OF THE INVENTION

It is the main object of this invention to provide an endless chain belt conveyor system for transporting articles along a path having a curved as well as straight line sections with a smooth, relatively effortless movement, free of jitter and strain.

It is a further object of this invention to provide roller brackets which are attachable to rubberized, fine mesh and other forms of standard belting, the rollers in conjunction with guide rails serving to effect straight line tracking of the conveyor belt. A salient feature of a conveyor belt having rollers attached to both edges thereof is that on curves, the stress is always on the outer radius and on straight runs, the rollers maintain positive tracking to prevent lateral displacement of the belt.

OUTLINE OF THE DRAWING

For a better understanding of the invention as well as other objects and further features thereof, reference is made to the following detailed description to be read in conjunction with the accompanying drawing, wherein:

FIG. 1 is a perspective view of an endless chain, lateral-bend conveyor belt embodying the principles underlying the invention, as seen looking toward the inner rail of the conveyor trackway;

FIG. 2 is a perspective view of the same conveyor, as seen looking toward the outer rail of the trackway;

FIG. 3 is a plan view showing a portion of the conveyor chain belt structure;

FIG. 4 shows an individual link;

FIG. 5 shows the manner in which the chain belt is driven;

Figure 9:
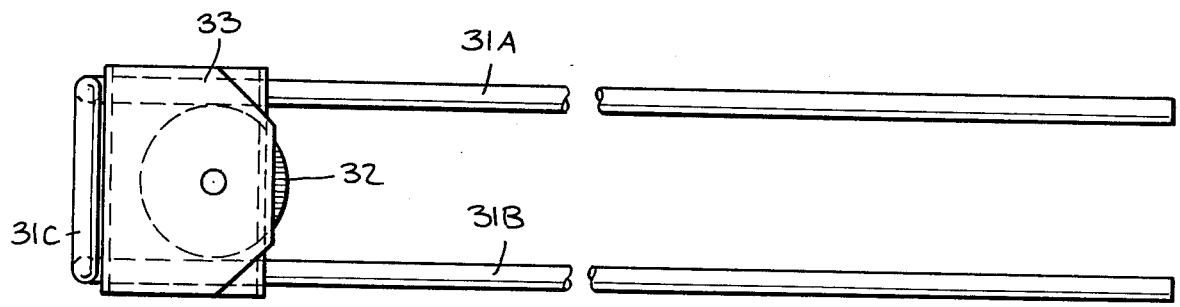
Figure 10:
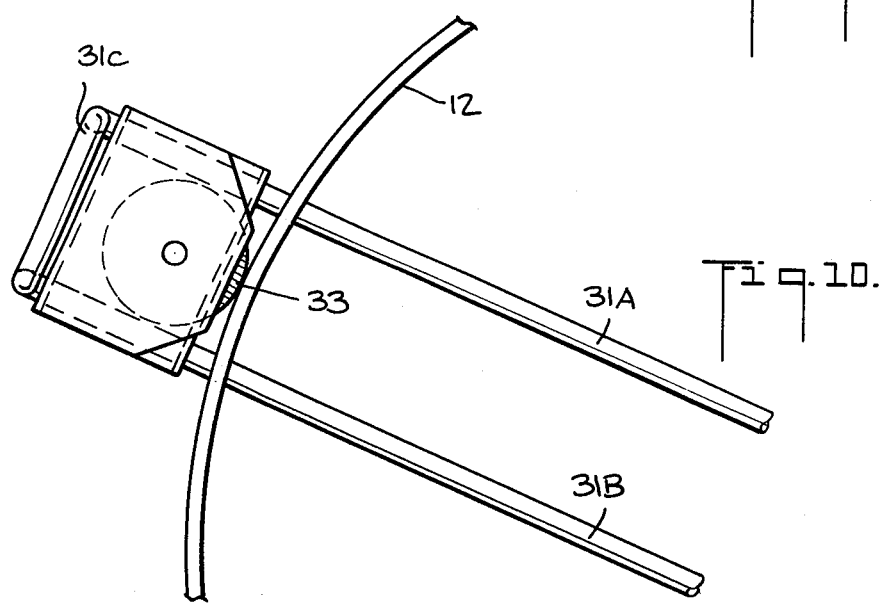
Figure 14:
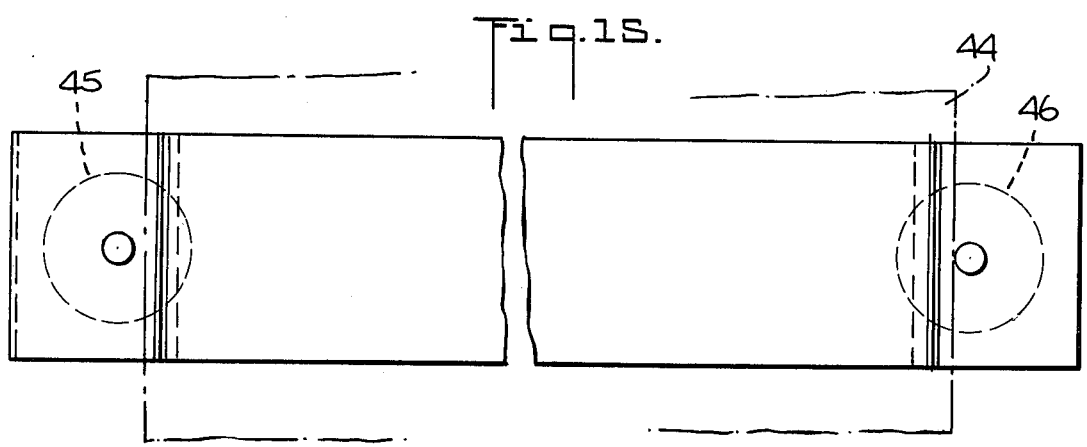
Figure 14:
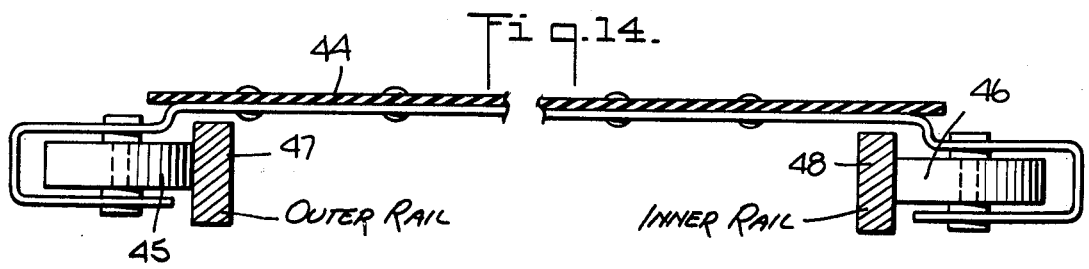
Figure 12:
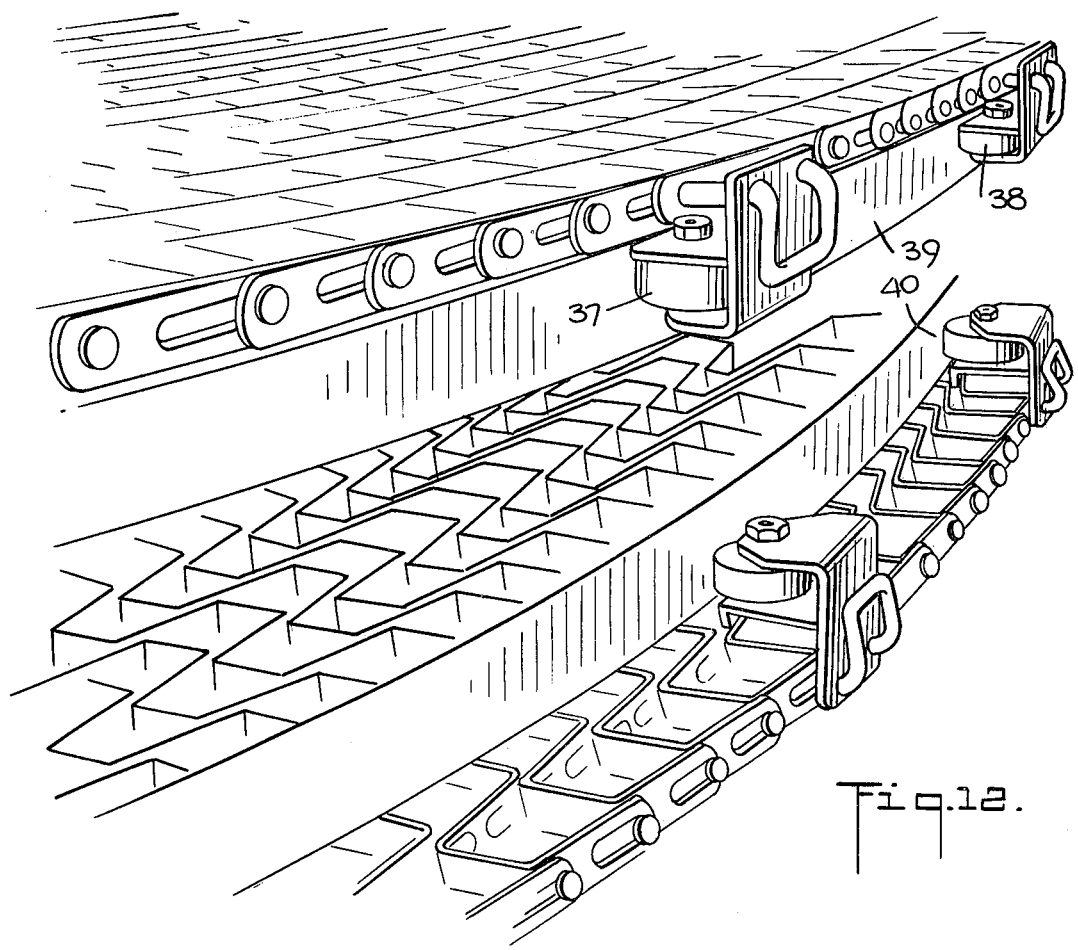
Figure 13:
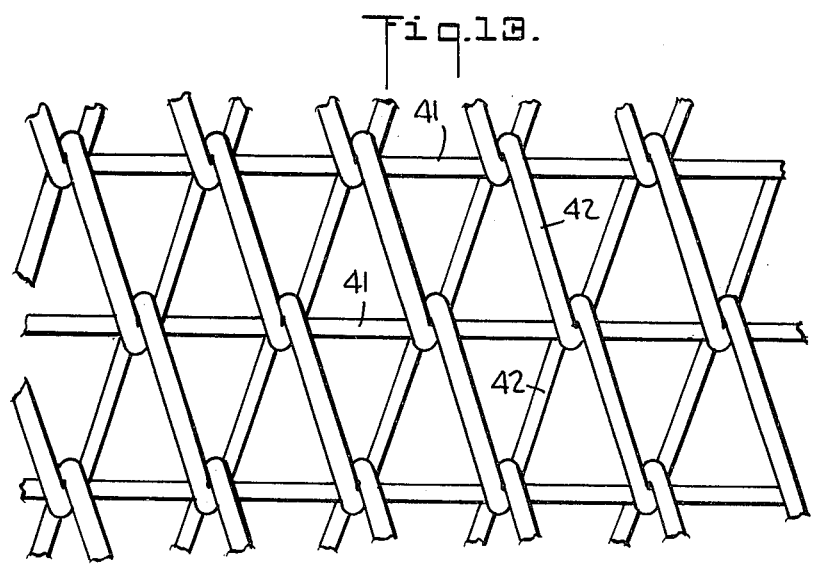

FIG. 6 schematically illustrates the relationship between the belt and the rails of the trackway;

FIG. 7 is a perspective view of a double cross-rod and roller assembly according to the invention;

FIG. 8 shows the cross-rod without the roller;

FIG. 9 is a plan view of the double cross-rod and roller assembly;

FIG. 10 shows the relationship of the assembly to the outer rail of the trackway;

FIG. 11 shows another form of linkage for the conveyor belt;

FIG. 12 shows a conveyor belt system employing the linkage of the type shown in FIG. 11;

FIG. 13 shows still another form of linkage for the conveyor belt;

FIG. 14 shows in end view a double-ended bracket and roller assembly for a standard belt; and FIG. 15 illustrates the double-ended bracket and roller assembly in plan view.

DESCRIPTION OF THE INVENTION

Referring now to FIGS. 1 and 2, there is shown an endless chain belt conveyor assembly in accordance with the invention, which is adapted to negotiate a 90° turn. It is to be understood, however, that a lateral-bend conveyor operating on essentially the same principle may be designed to negotiate other turns, such as 180°.

The conveyor assembly includes an endless chain belt generally designated by numeral 10, operating within an arcuate trackway defined by a curved inner rail 11 and a curved outer rail 12 concentric therewith. The trackway is supported on a frame 13. The chain belt extends between a driven roll 14 supported in suitable bearings at the output end of the conveyor and an idler roll 15 disposed at the input end thereof. The driven roll is operatively coupled by a pulley and belt system or other conventional power transmission means, to a motor (not shown). The lower reach of the endless chain belt runs over a series of supporting rolls 16, 17, 18 and 19.

As best seen in FIG. 3, the endless chain belt 10 is constituted by a continuous train of interlinked equispaced cross rods 20 which diverge 1° from each other, so that as one goes from the end of the rods adjacent the inner rail toward those adjacent the outer rail, the rods fan out and the spacing between adjoining rods increases progressively.

Pivotally connected to the cross rods are eight rows of slat-like links designated as rows A to H. In practice, one may use a greater or smaller number of rows, depending on how wide a belt is specified.

Each slat-like link in rows A to H, as shown by representative link 21 in FIG. 4, is formed by a piece of sheet metal or other material having a trapezoidal form, the long sides thereof being turned in to define tubular channels 21A and 21B for receiving the associated cross rods. The links in row A adjacent the inner rail of the trackway each bridge a respective pair of cross rods 20, and since the cross rods are divergent, the tapered width of the links in row A is made such as to match the spacing between rods joined thereby. Since each link in row A bridges a respective pair of rods in the train thereof, no link exists in row A between the trailing rod in one rod pair and the leading rod in the next rod pair in the train.

Thus in FIG. 3, it will be seen that link $A_1$ in row A bridges the pair of rods $20_1$ and $20_2$, and that link $A_2$ bridges the pair of rods $20_3$ and $20_4$, whereby rods $20_2$–$20_3$ and $20_4$–$20_5$ remain unbridged. However, the links installed in row B are staggered with respect to those in row A, so that link $B_1$ in row B bridges the pair of rods $20_2$ and $20_3$, while link $B_2$ bridges the pair of rods $20_4$ and $20_5$. Here again the width and taper of the links are such as to match the spacing between rods, and since the spacing between the rods increases progressively, the links in row B are broader than those in row A.

Similarly in row C, the links in this row are staggered with respect to those in row B, and their dimensions are such as to match the spacing between the cross rods bridged thereby, this relationship being continued in rows D, E, F, G and H.

Drive roll 14, as best seen in FIG. 5, is provided with sprocket wheels 29 whose teeth fall into the spaces between the cross rods intermediate the rows of links, thereby advancing the chain belt as the drive roll rotates. Because of the spacing between links, air is free to circulate. Also the arrangement lends itself to easy and thorough cleaning, for all surfaces are exposed and there are no intermeshing wires which resist cleaning.

Secured to the outer marginal end of belt 10, as shown in FIG. 3, are rollers 30 which engage and roll along the outside surface of the outer rail 12, the inner marginal end of belt 10 being out of engagement with inner rail 11. The relationship between belt 10, inner rail 11 and outer rail 12 is illustrated schematically in FIG. 6. It will be seen that within the 90° turn, inner rail 11 is of small length and has a short radius r and that outer rail 12 is much longer and has a large radius R with respect to the common center C.

Since the belt is provided at its outer margin with a series of spaced rollers 30 which engage the outside surface of the outer rail, as the belt negotiates this turn, the resultant stresses are broadly distributed or dispersed along the full length of the curved outer rail, whereas no stresses are applied to the shorter inner rail, for the belt is out of contact with the inner rail. Thus there is no undue concentration or build-up of stresses and the movement of the belt in the curved trackway is smooth and free of jitter or strain.

Referring now to FIGS. 7, 8, 9 and 10 there is shown a preferred form of a double cross-rod and roller assembly having in lieu of individual cross rods, a double rod 31 which is formed by hair-pin bending a long wire so as to define a pair of rods 31A and 31B joined together by a bight 31C which is folded at right angles to the rods to create an end abutment. Mounted on the double rod is a roller fixture formed by a roller 32 supported for rotation between two spaced plates 33 and 34 extending laterally from a bracket member 35 having a pair of bores therein to receive cross rods 31A abd 31B, the bracket member lying against bight 31C. Thus to put together a double-rod and roller assembly, one has merely to insert the rods in the bores in the bracket wall and push the roller fixture to the bight position.

The links which join the cross rods may be of the type shown in FIG. 3 as in my prior patent, or they may be of other commercially-available types, such as the links 36 shown in FIGS. 7 and 11. These links are constituted by precision formed, flat wire pickets whose vertical legs are perforated with slot holes. The chain belt is assembled by inserting the cross rods through the trailing hole of the lead picket and the front end slot of the following picket. The free ends of the cross rods, that is those ends not having the rollers attached thereto, are terminated by button head welds. The hinging of the pickets on the rods provides the flexibility normally associated with all metal belts. The added function of the slot perforation is to permit the pickets to slide longitudinally on the rods. This nesting or telescoping action makes possible lateral flexibility, that is the ability of the belt to turn right or left.

Thus in FIG. 12, there is shown a chain belt which is formed by pickets in combination with ordinary individual cross rods terminated by button welds at either end and with double cross-rod and roller assemblies 37 and 38 mounted at spaced positions along the belt. The rollers along the upper reach of the belt engage and run along the outside surface of a curved outer rail 39 while the rollers in the lower reach of the belt roll along the outside surface of a second outer rail 40 positioned directly below rail 39.

The belting may alternatively be of the type shown in FIG. 13 wherein the transverse rods 41 include double cross-rod and roller assemblies in accordance with the invention to provide marginal rollers on the belt, the rods being inserted through the hinges of relatively elongated spiral wires 42 which are woven together. Thus each link is formed by two stable triangles.

The problem often encountered with standard fine mesh or rubber conveyor belts is that of straight line tracking. Should the belt be confined between guide channels, the resultant friction may make it difficult to advance the belt smoothly. In accordance with the invention as shown in FIGS. 14 and 15, attached by means of rivets or other suitable means to the conveyor belt 43 is a double-ended bracket 44 having rollers 45 and 46 mounted at either end thereof, which rollers engage the outside surface of rails 47 and 48 to prevent lateral displacement of the belt in the course of movement.

When this belt is operated through a trackway having curved as well as straight sections, then on curves the stress is always on the outer radius, whereas on straight runs the rollers maintain positive tracking.

While there has been shown preferred embodiments of the invention, it will be appreciated that many changes and modifications may be made therein without, however, departing from the essential spirit of the invention as disclosed herein.

I claim:

1. An endless chain belt conveyor system for transporting articles along a path which includes a straight line section, said straight line section comprising:

A. a trackway extending along said straight line section and constituted by a pair of parallel rails,
B. an endless belt movable along said trackway and having a width which is greater than the distance between the outer surfaces of said pair of rails, the opposing outer margins of said belt overhanging the respective rails of said trackway and riding thereover whereby said rails which lie below the belt function as a bed for said belt, and
C. rollers mounted on the underside of the overhangs of said belt at spaced positions along the outer margins thereof, the rollers on one of said margins engaging and rolling along the outer surface of one of said rails and being tracked thereby, the rollers on the other of said margins engaging and rolling along the outer surface of the other of said rails and being tracked thereby, whereby lateral displacement of the belt in the course of movement is prevented, the upper side of said overhangs being free of obstruction to provide an uninterrupted belt surface which may be lifted relative to said rails, the rollers at opposing margins of the belt being rotatably supported at either end of a double-ended bracket whose shank is attached to said belt.

2. A conveyor system as set forth in claim 1, wherein said belt is of the fine mesh type.

3. A conveyor system as set forth in claim 1, wherein said belt is fabricated of rubber.

* * * * *